United States Patent
Di Nunno et al.

(10) Patent No.: US 9,903,319 B2
(45) Date of Patent: Feb. 27, 2018

(54) INTERNAL COMBUSTION ENGINE WITH INTERNAL EXHAUST GAS RECIRCULATION FLOW CONTROL WITH VARIABLE EXHAUST REBREATHING

(71) Applicant: GM Global Technology Operations LLC, Detroit, MI (US)

(72) Inventors: Davide Di Nunno, Turin (IT); Manuel A. Gonzalez Delgado, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 15/003,245

(22) Filed: Jan. 21, 2016

(65) Prior Publication Data
US 2017/0211520 A1    Jul. 27, 2017

(51) Int. Cl.
F02M 26/01    (2016.01)
F02D 21/08    (2006.01)
F02D 13/02    (2006.01)

(52) U.S. Cl.
CPC ......... *F02M 26/01* (2016.02); *F02D 13/0265* (2013.01); *F02D 21/08* (2013.01)

(58) Field of Classification Search
CPC ................................ F02M 26/01; F02D 21/08
USPC .................................................... 123/568.21
See application file for complete search history.

(56) References Cited

U.S. PATENT DOCUMENTS

| | | | | |
|---|---|---|---|---|
| 4,759,321 | A * | 7/1988 | Matsumoto | F01L 1/181 123/90.15 |
| 5,080,055 | A * | 1/1992 | Komatsu | F01L 1/08 123/90.11 |
| 6,135,078 | A * | 10/2000 | Doi | F01L 1/344 123/90.17 |
| 7,308,872 | B2 * | 12/2007 | Sellnau | F01L 13/0036 123/90.16 |
| 2008/0047509 | A1 * | 2/2008 | Sellnau | F01L 1/185 123/90.15 |
| 2011/0114067 | A1 * | 5/2011 | Gonzalez Delgado | F01L 1/053 123/568.11 |
| 2013/0340427 | A1 | 12/2013 | Gonzalez Delgado et al. | |
| 2014/0013739 | A1 | 1/2014 | Gonzalez Delgado et al. | |
| 2014/0026874 | A1 * | 1/2014 | Dean | F02D 21/08 123/568.21 |

(Continued)

*Primary Examiner* — Joseph Dallo
*Assistant Examiner* — Yi-Kai Wang
(74) *Attorney, Agent, or Firm* — Harness, Dickey & Pierce, P.L.C.

(57) ABSTRACT

An internal combustion engine includes a variable valvetrain system for improving the range of controllability of the internal EGR technique adjusts the internal EGR lift in a more favorable window and position compared to the internal EGR window typically utilized. In particular, a combined change of lift, phase and duration of the internal EGR lift of the exhaust vale improves the controllability and stability of the desired amount of internal EGR. The present system achieves a high internal EGR capability at low loads and lower back pressure. The system also achieves controllability of internal EGR at high loads without requiring ultra low lifts. The system also allows warm-up of the exhaust after treatment system faster for higher conversion efficiency, reduced HC and NOx engine-out emissions and increased combustion stability.

1 Claim, 8 Drawing Sheets

(56) References Cited

U.S. PATENT DOCUMENTS

2014/0144414 A1   5/2014   Dean et al.
2016/0160710 A1*  6/2016   Roth ..................... F02D 41/12
                                              123/90.11

* cited by examiner

US 9,903,319 B2

INTERNAL COMBUSTION ENGINE WITH INTERNAL EXHAUST GAS RECIRCULATION FLOW CONTROL WITH VARIABLE EXHAUST REBREATHING

FIELD

The present disclosure relates to internal combustion engines and more particularly, to an internal combustion engine utilizing internal exhaust gas recirculation.

BACKGROUND

This section provides background information related to the present disclosure which is not necessarily prior art.

In the internal combustion engines in use today, it is common to use a portion of the exhaust gasses to improve the engine performance or the emissions of the combustion. A typical benefit of the use of the exhaust gas recirculation (EGR) is the reduction of the peak combustion temperature in order to avoid the creation of pollutants like NOx or the reduction of the required amount of throttling in gasoline engines. Typically, the recirculation is obtained by an external piping which brings a portion of the exhaust gasses back into the intake manifold.

In recent years, an improved internal exhaust gas recirculation (internal EGR) technique has been used in order to minimize the waste of energy (waste of heat through the piping loop, waste of flow dynamic losses along the piping) of such a system bringing further benefits like the more stable combustion in cold conditions, the reduction of pollutants or an improvement of fuel efficiency. The internal EGR technique includes the opening of the exhaust gas valve during the intake stroke phase creating a so-called rebreathing lift. The control of the amount of internal EGR is obtained by applying a higher or lower lift of the exhaust valve during the intake stroke of the cylinder where the differential pressure between the exhaust manifold and the combustion chamber is in favor of filling the combustion chamber itself with exhaust gasses.

Controlling the amount of internal EGR only with the usage of a higher or lower re-breathing lift brings to an edge where a small variation of such a lift corresponds to a huge variation of the gas recirculated. Such a situation limits the usage of the internal EGR technique to a restricted area of the engine map.

SUMMARY

This section provides a general summary of the disclosure, and is not a comprehensive disclosure of its full scope or all of its features.

In order to improve the responsiveness of the variable valvetrain system and improve the range of controllability of the internal EGR technique, the present disclosure adjusts the lift in a more favorable window and position compared to the internal EGR window typically utilized. In particular, the present discourse utilizes a combined change of lift, phase and duration in order to improve the controllability and stability of the desired amount of EGR. The present system achieves a high internal EGR capability at low loads and lower back pressure. The system also achieves controllability of internal EGR at high loads without requiring ultra low lifts. The system also allows warm-up of the exhaust after treatment system faster for higher conversion efficiency, reduced HC and NOx engine-out emissions and increased combustion stability.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
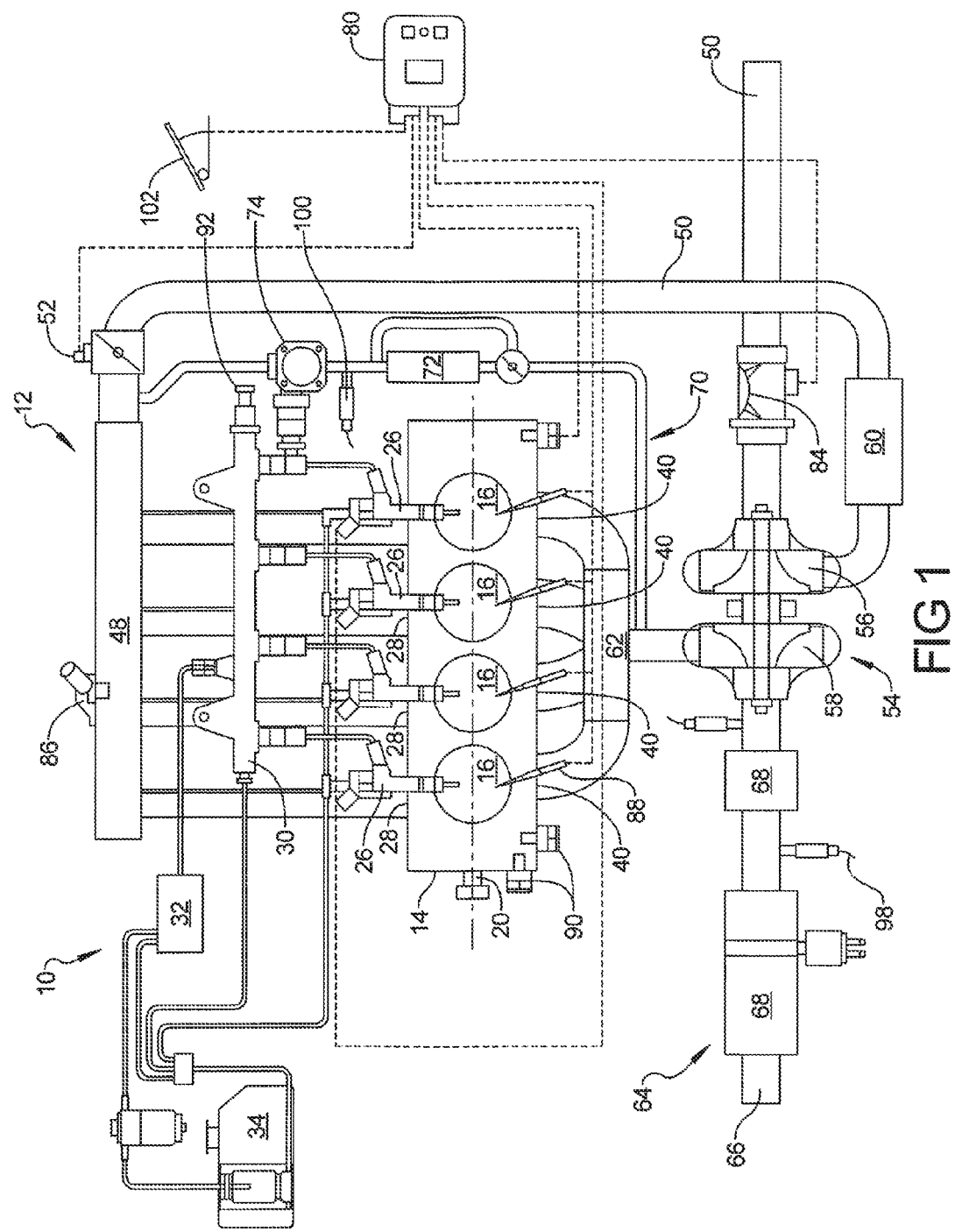
FIG. 1 shows a possible embodiment of an automotive system comprising an internal combustion engine.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
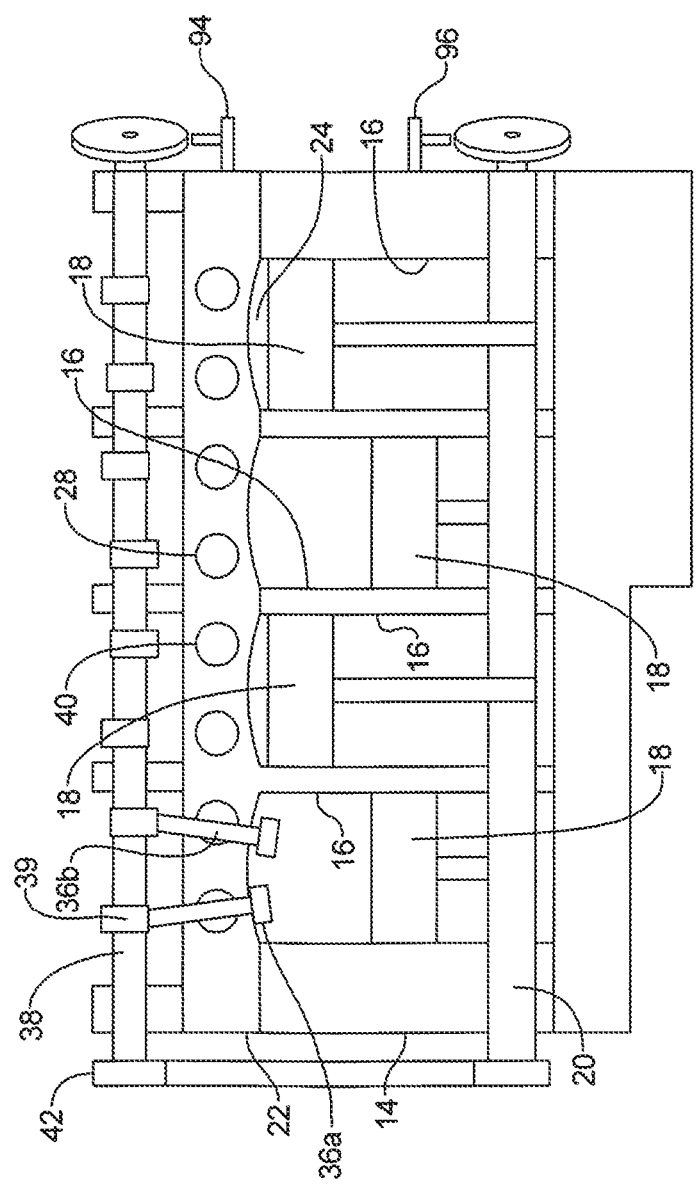
FIG. 2 is a cross-section the internal combustion engine of FIG. 1.

With reference to FIGS. 1 and 2, an automotive system 10 is shown, that includes an internal combustion engine (ICE) 12 having an engine block 14 defining at least one cylinder 16 having a piston 18 coupled to rotate a crankshaft 20. A cylinder head 22 cooperates with the piston 18 to define a combustion chamber 24. A fuel and air mixture (not shown) is disposed in the combustion chamber 24 and ignited, resulting in hot expanding exhaust gasses causing reciprocal movement of the piston 18. The fuel is provided by at least one fuel injector 26 and the air through at least one intake port 28. The fuel is provided at high pressure to the fuel injector 26 from a fuel rail 30 in fluid communication with a fuel pump 32 that increase the pressure of the fuel received from a fuel source 34. Each of the cylinders 16 has at least two cylinder valves 36a, 36b, actuated by one or more camshaft 38 rotating in time with the crankshaft 20. The intake cylinder valves 36a can be driven by an intake cam 39 on camshaft 38 and selectively allow air into the combustion chamber 24 from the port 28 and alternately the exhaust cylinder valves 36b allow exhaust gases to exit through a port 40, as is known in the art. A cam phaser 42 is provided to selectively vary the timing between at least one of the camshaft(s) 38 and the crankshaft 20.

Figure 3:
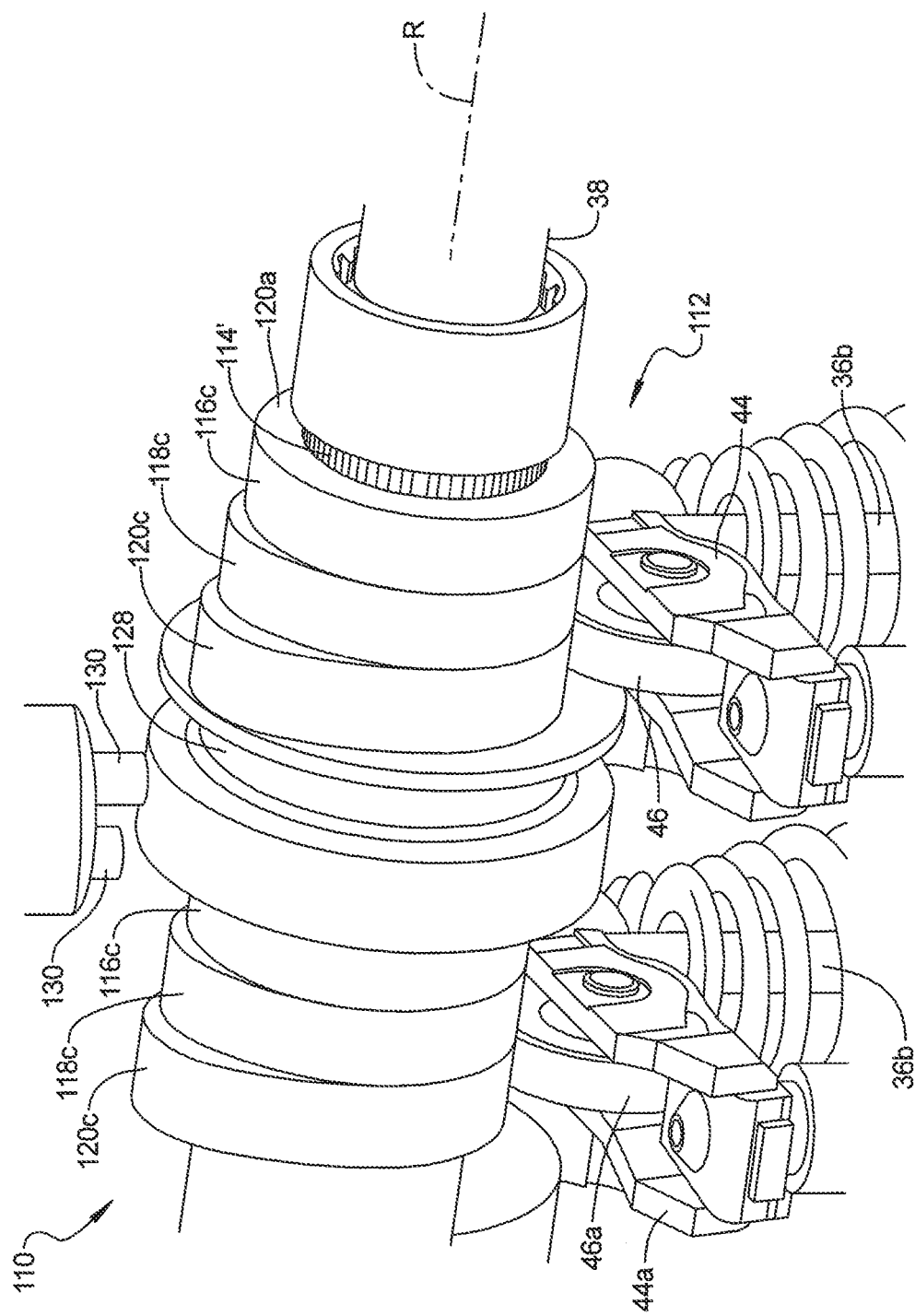
FIG. 3 is a detailed view of a possible embodiment of a cam shifting system used in an internal combustion engine according to the principles of the present disclosure, wherein two cam followers are shown.

In the detailed view of an embodiment shown in FIG. 3, two exhaust cylinder valves 36b, 36b are partially visible and are provided with a cam follower 44, 44a. The cam followers 44, 44a can be provided with a cam follower roller 46, 46a intended to contact the cams arranged on the camshaft 38, as it will be disclosed in greater detail below. It has to be noted that different types of cam followers 44, 44a can be used, such as for example cam followers provided with a rocker arm.

In the embodiments shown in FIGS. 1, 2 and 3, the internal combustion engine 12 is provided with at least two exhaust cylinder valves 36b, 36b for each cylinder, e.g. two exhaust cylinder valves, however, the present invention can be also applied to internal combustion engines provided with one or more exhaust cylinder valves for each cylinder. The air may be distributed to the air intake port(s) 28 through an intake manifold 48. An air intake duct 50 may provide air from the ambient environment to the intake manifold 48. In other embodiments, a throttle body 52 may be provided to regulate the flow of air into the manifold 48. In still other embodiments, a forced air system such as a turbocharger 54, having a compressor 56 rotationally coupled to a turbine 58, may be provided. Rotation of the compressor 56 increases the pressure and temperature of the air in the intake duct 50 and manifold 48. An intercooler 60 disposed in the intake duct 50 may reduce the temperature of the air. The turbine 58 rotates by receiving exhaust gases from an exhaust manifold 62 that directs exhaust gases from the exhaust ports 40 and through a series of vanes prior to expansion through the turbine 58. The exhaust gases exit the turbine 58 and are directed into an exhaust system 64.

The exhaust system 64 may include an exhaust pipe 66 having one or more exhaust after treatment devices 68. The after treatment devices 68 may be any device configured to change the composition of the exhaust gases. Some examples of after treatment devices 68 include, but are not limited to, catalytic converters (two and three way), oxidation catalysts, lean $NO_x$ traps, hydrocarbon adsorbers, selective catalytic reduction (SCR) systems, and particulate filters. Other embodiments may include an exhaust gas recirculation (EGR) system 70 coupled between the exhaust manifold 62 and the intake manifold 48. The EGR system 70 may include an EGR cooler 72 to reduce the temperature of the exhaust gases in the EGR system 70. An EGR valve 74 regulates a flow of exhaust gases in the EGR system 70.

The automotive system 10 may further include an electronic control unit (ECU) 80 in communication with one or more sensors and/or devices associated with the internal combustion engine 12. The ECU 80 may receive input signals from various sensors configured to generate the signals in proportion to various physical parameters associated with the internal combustion engine 12. The sensors include, but are not limited to, a mass airflow and temperature sensor 84, a manifold pressure and temperature sensor 86, a combustion pressure sensor 88, coolant and oil temperature and level sensors 90, a fuel rail pressure sensor 92, a cam position sensor 94, a crank position sensor 96, exhaust pressure and temperature sensors 98, an EGR temperature sensor 100, and an accelerator pedal position sensor 102. Furthermore, the ECU 80 may generate output signals to various control devices that are arranged to control the operation of the ICE 12, including, but not limited to, fuel injectors 26, the throttle body 52, the EGR valve 74, and the cam phaser 42. Dashed lines are used to indicate communication between the ECU 80 and the various sensors and devices, but some are omitted for clarity.

Turning now to the ECU 80, this apparatus may include a digital central processing unit (CPU) in communication with a memory system, or data carrier, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices.

With reference to FIGS. 3-7, according to a possible embodiment, the internal combustion engine 12 comprises a cam shifting system 110 comprising a shifting unit 112. According to a possible embodiment, as for the example shown in the figures, the shifting unit 112 is a hollow element, preferably having a cylindrical shape. The shifting unit 112 is coupled rotatably fixed to the camshaft 38. In other words, when the camshaft 38 rotates around a camshaft rotation axis R, the shifting unit 112 rotates together with the camshaft 38. Furthermore, the shifting unit 112 is movable, with respect to the camshaft 38, preferably it is axially moveable along the camshaft rotation axis R. As mentioned, this axial movement is known as "shifting movement" of the shifting unit 112.

The shifting unit 112 is coupled to the camshaft 38 to be rotatably fixed and axially moveable by means known in the art. In the shown embodiments, the shifting unit 112 is provided with an internal splines 114, that meshes with an external splines 114' of the camshaft 38. Thanks to the splined engagement 114, 114', the rotational movement of the camshaft 38 is transmitted to the shifting unit 112; furthermore, the shifting unit 112 can slide on the camshaft 38 along the camshaft rotation axis R. The shifting unit 112 is provided with two or more cams 116, 118, 120 for a cam follower 44, 44a.

According to a possible embodiment, the shifting unit 112 comprises a first cam 116 provided with a first cam base circle 116a with an exhaust cam lobe 116b and an EGR cam lobe 116c extending from the base circle 116a, a second cam 118 provided with a second cam base circle 118a and with an exhaust cam lobe 118b and an EGR cam lobe 118c extending from the base circle 118a and a third cam 120 provided with a third base circle 120a and with an exhaust cam lobe 120b and an EGR cam lobe 120c extending from the third base circle 120a. The shifting unit 112 can also comprise additional cams. According to a possible embodiment, the additional cams can include exhaust cam lobes and EGR cam lobes of different height and/or different circumferential length than the first through third cams 116, 118, 120, or can be provided with only a cam base circle to form a deactivation cam of the shifting unit 112, or can be provided with a cam base circle and with just an exhaust cam lobe and no EGR cam lobe so that the internal EGR can be disabled.

Figure 7:
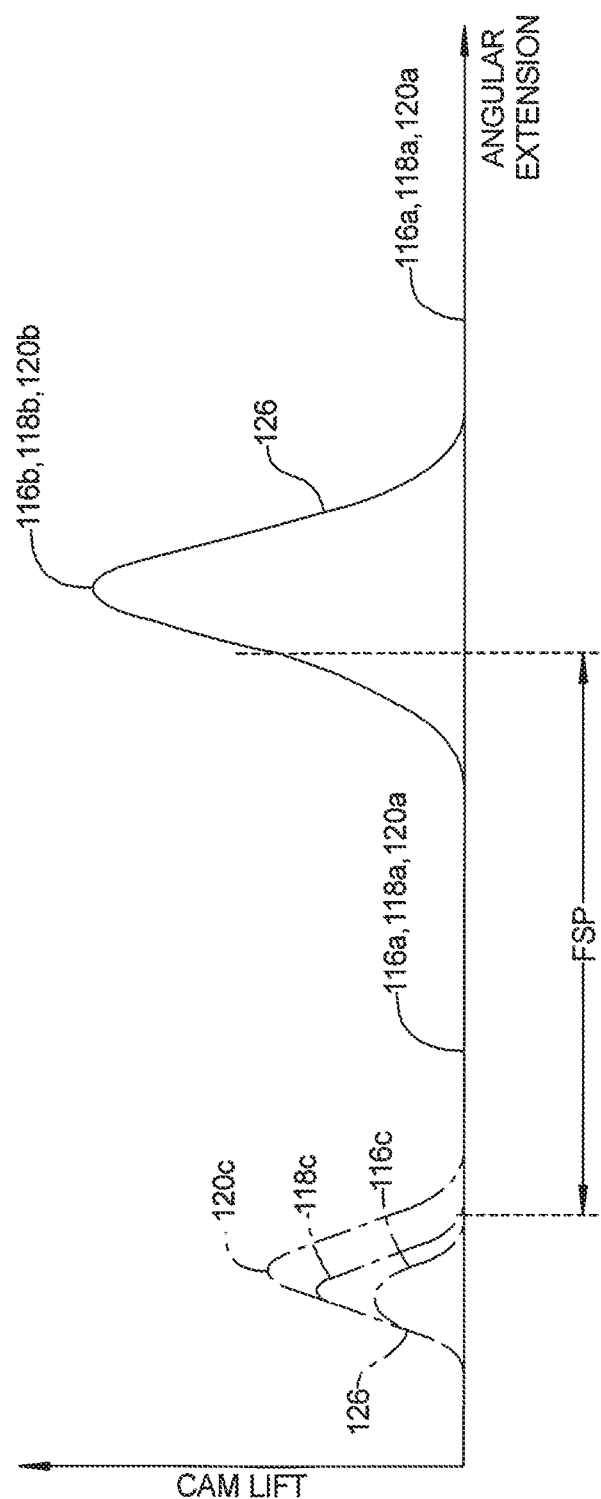
FIG. 7 is a graphic representation of the cams of a possible embodiment of the cam shifting system used in an internal combustion engine according to the present disclosure.

The contour of the EGR cam lobes 116c, 118c, 120c, as well as the exhaust cam lobes 116b, 118b, 120b are visible in FIG. 7, that is a graphical illustration showing the shape of the cams along their extension around the camshaft rotation axis R. More in detail, FIG. 7 shows the lift provided by the cams 116, 118 and 120 (on the y-axis (ordinate)) and the extension in 360 degrees about the camshaft rotation axis R (on the x-axis (abscissa)). Cam followers 44, 44a are part of relevant cylinder valves 36b, 36b. As known, the coupling between the cams 116, 118, 120 and the cam followers 44, 44a transforms the rotational movement of the camshaft into a reciprocating movement of the cylinder valves 36b, 36b. Part of the cams 116, 118, 120 are arranged one next to the other. In the shown embodiments, cam 116 is arranged next to cam 118, and cam 120 is arranged next to cam 118. It has to be noted that the cams intended to contact the cam followers 44, 44a, are shown in the attached figures with the same reference numbers 116, 118 and 120.

It has to be noted that in the following, reference will be made to only one cam follower 44 of a cylinder valve 36b intended to contact the cams 116, 118, 120 of the shifting unit 112. What is disclosed in connection to the cam follower 44 can be applied to the other cam followers of the engine, such as for example to the cam follower 44a shown in FIG. 3.

According to a possible embodiment, as for example shown in FIG. 3, the same shifting unit 112 can be provided with two or more cams 116, 118, 120 for two or more cam followers. For example, in the embodiment shown in FIG. 3, a single shifting unit 112 is provided with two or more cams for the two cam followers 44, 44a. However, according to different possible embodiments, two shifting units can be provided, having two or more cams 116, 118, 120, to engage respectively the cam follower 44 and the cam follower 44a. Cams 116 and 118 can engage cylinder valve 36b, and in particular the cam follower 44. As mentioned above, the following description applies also to cams 116, 118 and 120 intended to be engaged by cam follower 44a of the cylinder valve 36b.

Cams 116, 118 and 120 are each provided with a base circle 116a, 118a and 120a. Additionally cams 116 and 118 are also each provided with exhaust lobes 116b, 118b, 120b and EGR lobes 116c, 118c, 120c that each protrude from the base circle 116a, 118a, 120a, respectively. As mentioned above, an additional cam can be a deactivation cam, i.e. cam not providing lift of the cylinder valve, and therefore it is provided only with the base circle.

Figure 6:
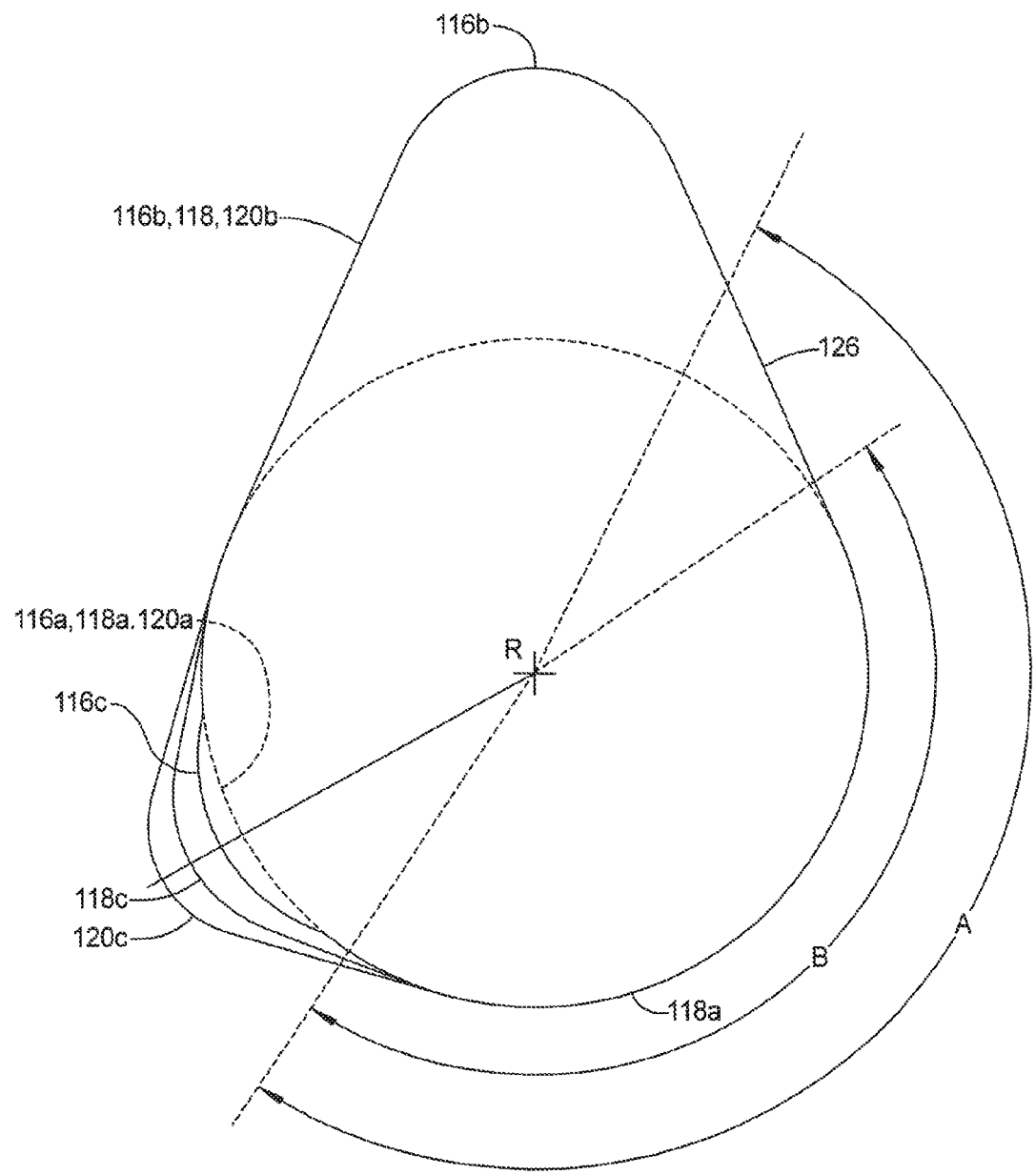
FIG. 6 is a planar schematic view of a possible embodiment of the shifting unit according to the present disclosure.

As shown in FIGS. 6 and 7, the cams 116, 118 and 120 can be provided with EGR cam lobes 116c, 118c, 120c having different heights relative to the camshaft rotation axis R. In addition, the EGR cam lobes 116c, 118c, 120c can have different circumferential lengths. The EGR cam lobes 116c, 118c and 120c can each also include different rotational starting locations so that the phase of each of the EGR cam lobes also differs relative to one another. Therefore, each of the cam lobes 116c, 118c, 120c provides a different actuation of the cylinder valve 36, and in particular a different lift height, phase and duration of the cylinder valve for tuning the internal EGR activation for different engine operating conditions. More in detail, an EGR cam lobe 116c of the first cam 116 can comprise a rear ramp portion 126 arranged at the same distance from the camshaft rotation axis R, of a portion 126 of the EGR cam lobe 118c of the second cam 118 and of a portion 126 of the EGR cam lobe 120c of the third cam 120, to provide the same return of the cam follower 44, 44a. These portions 126 of cam lobes of different cams 116, 118, 120 can be seen for example in the graphic representation of FIG. 7, wherein the return portion 126 of the cam lobes 116c, 118c, and 120c of cams 116, 118, 120 are partially overlapped, i.e. are arranged at the same distance from the camshaft rotation axis to provide the same lift of the cam follower. In other words, the adjacent cams 116, 118, 120 are provided with a portion 126 of a cam lobe that is arranged at the same distance from the camshaft rotation axis R, so as to provide the same lift of the cam follower 44 as it returns toward the base circle.

These portions 126 of the EGR cam lobes 116*c*, 118*c*, 120*c* can be placed next to one another, and they are arranged at the same distance from the camshaft rotation axis R. In other words, these portions form a common surface of the cams because they provide the same lift of the cylinder valve. As it will be explained subsequently, during the shifting movement of the shifting unit 112, the cam follower 44 engages at least a portion of a cam lobe, and preferably a portion of a cam lobe arranged at the same distance from the camshaft rotation axis of a portion of a cam lobe of another cam.

As known, when the cam follower 44 of a cylinder valve 36 engages the base circle 116*a*, 118*a* 120*a* of a cam, the cylinder valve is not actuated (not lifted) and preferably maintained in a closed position. On the contrary, when the cam follower 44 engages a cam lobe of a cam, the cylinder valve is lifted and thus opened. The height of the lobe determines the height or distance of the lift of the valve from the closed to the open position.

As for example shown in FIG. 7, the base circle 116*a*, 118*a*, 120*a* corresponds to the portion of the lines not providing a lift, while the cam lobes correspond to the portion of the lines providing a lift of the cam follower. According to an embodiment, the base circle 116*a* of cam 116 can have the same diameter of the base circle 118*a* of cam 118. Also, the base circle 120*a* of the further cam 120 can have the same diameter of the other base circles of the other cams 116, 118. The term diameter is used herein to indicate that the base circles 116*a*, 118*a* and 120*a* have the same distance from the camshaft rotation axis R. Preferably the distance is measured along a radial line passing through the camshaft rotation axis R. According to an embodiment, the cams 116, 118, 120 are provided with the exhaust cam lobes 116*b*, 118*b*, 120*b* each having the same shape, although the shapes (height and duration) of the exhaust cam lobes 116*b*, 118*b*, 120*b* can be different.

According to an embodiment, the shifting unit 112 can be provided with at least one groove 128. In particular, as for example in the shown embodiment, the internal combustion engine 12 is provided with at least one driving pin 130 that can be selectively engaged and disengaged from the groove 128. In the shown embodiments, see for example FIG. 3, two driving pins 130 are provided. The at least one driving pin 130 is actuated by a suitable device, such as for example an actuator controlled by the ECU 80 of the internal combustion engine, so as to be moved from at least a position in which it engages the groove 128 and at least a position in which it is disengaged from the groove 128. According to a possible embodiment, at least one driving pin 130 can be selectively extracted and retracted from a body of a suitable actuator, in order to engage/disengage the groove 128. The groove 128 comprises a shifting portion 128*a*, and the driving pin 130 is operable to be selectively engaged with and disengaged from the shifting portion 128*a* of the groove 128. The engagement between the driving pin 130 and the shifting portion 128*a* of the groove 128 causes the movement of the shifting unit 112 along the camshaft, i.e. causes the shifting movement of the shifting unit 112.

The shifting portion 128*a* can be shaped as a helical portion, i.e. as a curved path extending between two points, or portions, arranged at different distances from each other along the extension of the camshaft rotation axis. In other words, the shifting portion 128*a* is extending to connect points of the shifting unit external surface that are lying on different planes perpendicular to the camshaft rotation axis R. The shifting portion can be left-handed or right handed so that the shifting unit 112 can be moved during the rotation of the camshaft while the driving pin is engaged in the shifting portion 128*a* of the groove.

Figure 4:
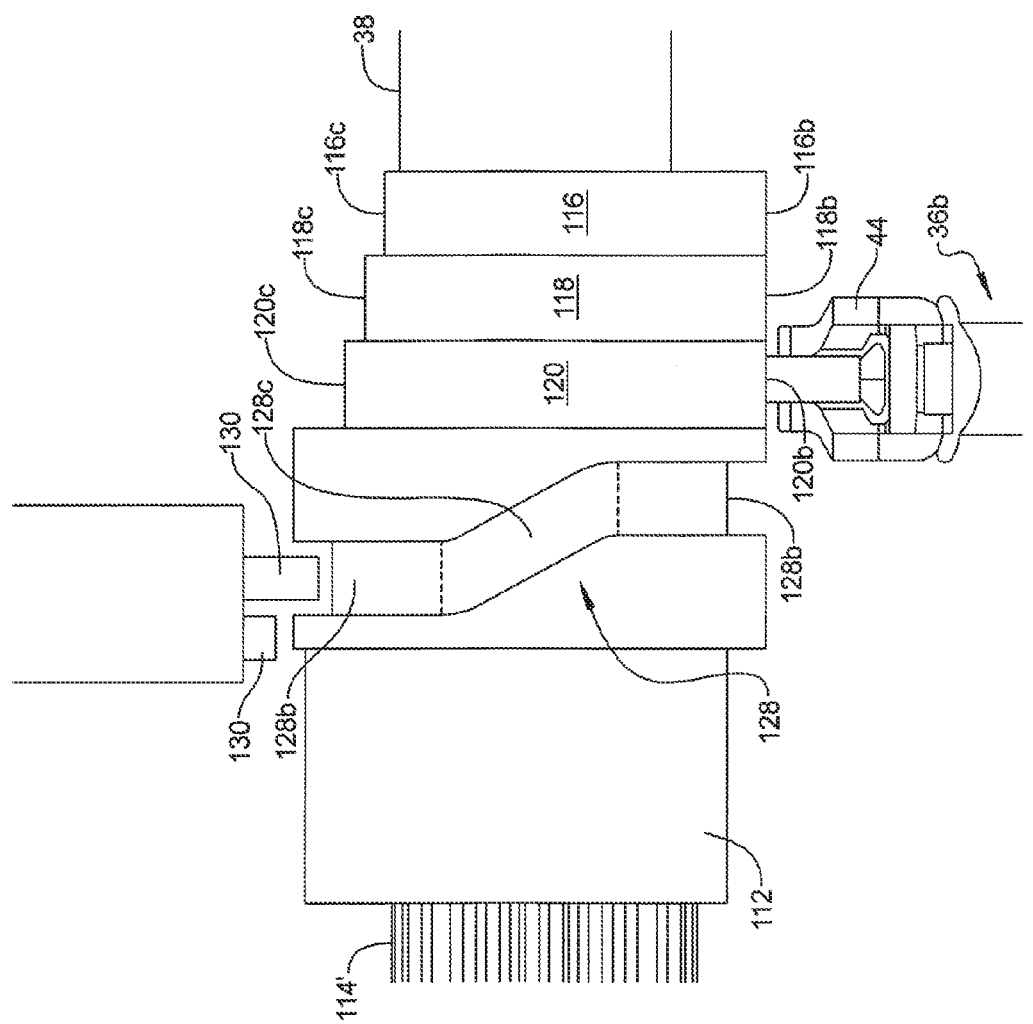
FIG. 4 is a schematic view showing a cam follower engaging a cam of the shifting unit, the shifting portion of the groove, and the driving pin.
Figure 5:
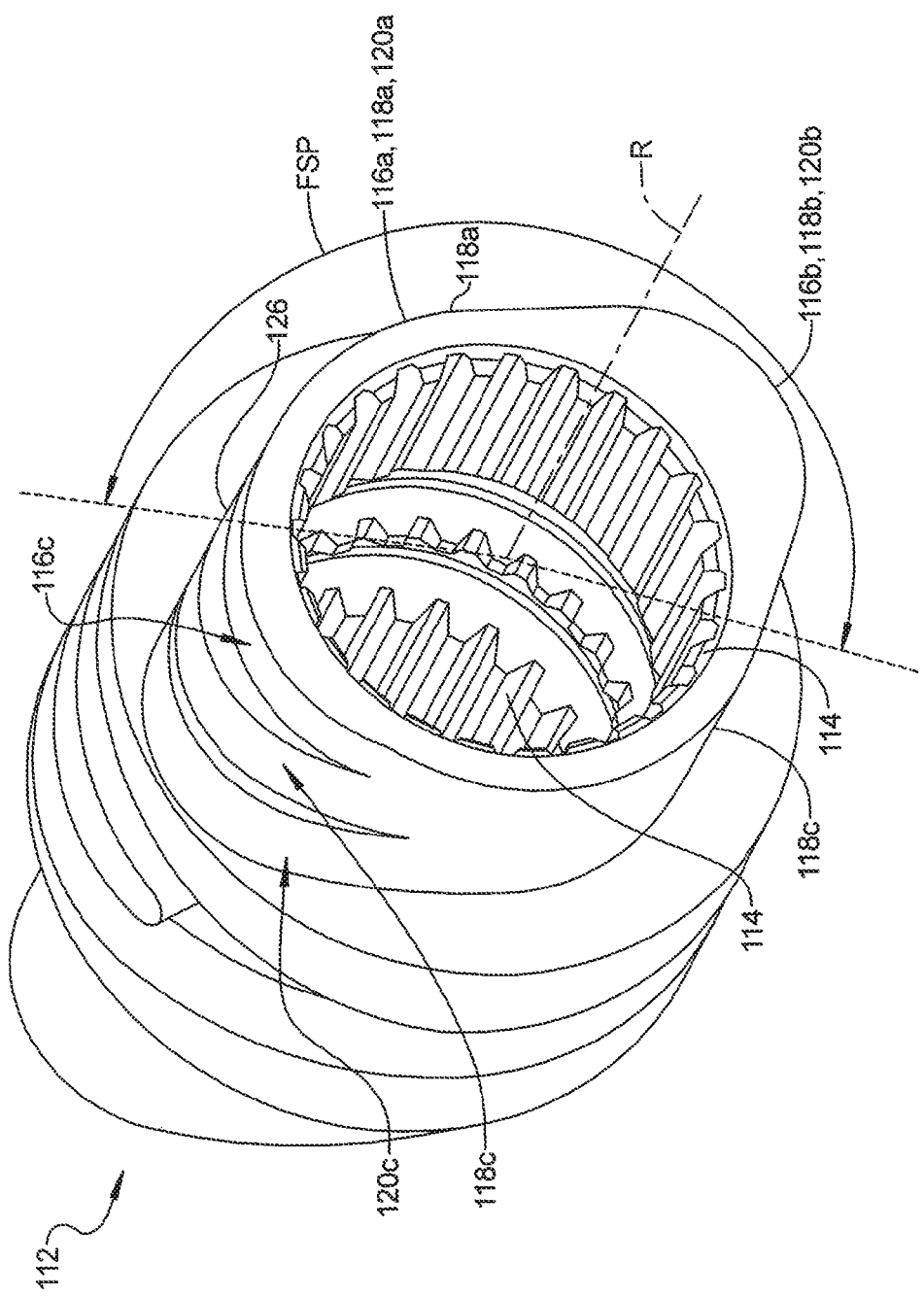
FIG. 5 is a perspective view of a possible embodiment of the shifting unit according to the present disclosure.

As visible for example in the schematic view of FIG. 4, when the driving pin 130 is operated to engage the shifting portion 128*a*, the shifting unit 112 is moved along the camshaft. Due to the shifting movement of the shifting unit 112, the cam follower 44 engages at least two different cams. In other words, before starting the shifting movement of the shifting unit the cam follower 44 engages a first cam 116, while at the end of the shifting movement, the cam follower engages a different cam 118. It has to be noted that the shifting portion 128*a* is shown in a schematic manner and its extension has been reduced to allow a clear representation. The shifting portion 128*a*, i.e. the helical portion, extends between two rectilinear portions 128*b* of the groove 128 which are extending on two planes perpendicular to the camshaft rotation axis, so that when the driving pin 130 engages said rectilinear portions 128*b* of the groove 128, the shifting unit 112 is not moved along the camshaft rotation axis.

It has to be noted that the shifting unit 112 can be moved along the camshaft, by means of the shifting portion 128*a* of the groove 128 between at least two positions, corresponding to positions in which the cam follower 44, 44*a* engages respectively two different cams 116, 118, 120 of the shifting unit 112.

It has to be noted that the cam shifting system 110 of the internal combustion engine may comprise two or more driving pins 130, as for example shown in FIG. 3, so as when different driving pins 130 engage the shifting portion 128*a*, different movement of the shifting unit 112 along the camshaft rotation axis can be obtained, corresponding to different positions in which the cam follower 44 engages different cams 116, 118, 120. During the movement of the shifting unit along the camshaft rotation axis, i.e. during the shifting movement caused by the engagement of the driving pin 130 with the shifting portion 128*a*, the cam follower 44, and in particular the cam follower roller 46 engages (contacts) at least two cams 116, 118, 120.

The cam shifting system 110 according to the present disclosure and in particular the shifting portion 128*a* is configured such that during the shifting movement of the shifting unit 112 along said camshaft rotation axis R, the cam follower 44 engages at least a portion of at least one cam lobe 116*b*, 118*b*. In other words, the cam follower engages also the cam lobe of the cam in addition to the cam base circle used in the known cam shifting systems, when the shifting unit is moved along the camshaft to provide the engagement of the cam follower from a first cam to at least one different cam 116, 118, 120. More in detail, the shifting portion 128*a* of the groove 128 is extending on an arc A of the external surface of the shifting unit 112, providing a cam follower shifting path FSP (see for example FIG. 7) between at least two cams 116, 118, 120, and the cam follower shifting path comprises at least a portion of at least one cam lobe 116*b*, 118*b*. In other words, when the shifting unit is moved along the camshaft, the cam follower 44 is moved between at least two cams 116, 118,120 i.e. it is moved from a position in which it engages a first cam 116 into a position in which it engages a different cam 118.

According to a possible embodiment, as for example shown in FIG. 4, the shifting portion 128*a* of the groove 128 is extending on an arc A that is greater than the arc B on which the base circle 116*a*, 118*a*, 120*a* is extending. The arcs A and B cover angles measured from the camshaft rotation axis R. Advantageously, the shifting portion 128*a* is extending along the surface of the shifting unit, thus corresponding to an arc of the rotation of the camshaft, that is greater than the extension of the base circle of a cam of the shifting unit. It follows that when the shifting unit is shifted along the camshaft, due to the engagement of the driving pin with the shifting portion 128a, the cam follower engages the base circle and also at least a portion of the cam lobe 116b, 118b, 120b. According to a possible embodiment, the arc B on which the base circle 116a, 118a, 120a extends, is defined by the longest base circle 116a, 118a, 120a of said at least two cams 116, 118, 120.

The cam follower shifting path FSP, also called cam follower shifting window, i.e. the portion of the cams 116, 118, 120 engaged by the cam follower 44 when the shifting unit is moved along the camshaft rotation axis R while it is rotated together with the camshaft, comprises the cam lobes 116b, 118b, 120b as well as the base circle portions 116a, 118a, 120a (see for example FIG. 7). In other words, the cam follower shifting path FSP represents the surface of the cams contacted by the cam follower during the rotation of the camshaft while the shifting unit is moved along the camshaft due to the engagement of the driving pin 130 with the shifting portion 128a of the groove 128. The cam follower shifting path FSP can be also seen as the arc of the cams contacted by the cam follower, during the rotation of the camshaft while the shifting unit is moved along the camshaft.

As already mentioned above, the contact of the cam follower 44 with a cam lobe of the cam advantageously allows to increase the cam follower shifting path FSP, so that the shifting movement of the shifting unit can be performed in an increased rotation angle of the camshaft, thus increasing the time available to carry out the shifting movement and thus reducing the accelerations involved. Advantageously, according to a possible embodiment, during the shifting movement of the shifting unit 112 along the camshaft 38, the cam follower 44 can therefore engage at least a portion of the base circle 116a of a first cam 116 and at least a portion of the cam lobe 118b of a second cam 118. According to a possible embodiment, during the shifting movement of the shifting unit 112, the cam follower 44 engages two cam lobes of at least two different cams.

According to a possible embodiment, a portion 126 of a cam lobe 116b of a cam 116 is arranged at the same distance from the camshaft rotation axis R, of a portion 126 of a cam lobe 118b of a different cam 118, so as to provide the same lift of the cam follower 44. In other words, portions 126 of cam lobes 116b, 118b, belonging to two different cams 116, 118, preferably belonging to two adjacent cams, are arranged at the same distance from the camshaft rotation axis R. More in detail, the cams 116, 118 have a common surface, on a portion of their cam lobes, arranged at the same distance from the camshaft rotation axis R, so as the same lift of the cam follower, and thus of the cylinder valve 36, can be provided.

Advantageously, according to an embodiment of the invention, during the shifting movement of the shifting unit 112 along the camshaft rotation axis R, the cam follower 44 engages a portion 126 of the cam lobe that is arranged at the same distance with respect to the camshaft rotation axis of a portion 126 of the cam lobe of another cam. According to a possible embodiment, during the shifting movement of the shifting unit 112 along the camshaft rotation axis R, the cam follower 44 engages the portions 126 of two cam lobes that are arranged at the same distance with respect to the camshaft rotation axis.

According to a possible embodiment, the portion 126 arranged at the same distance from the camshaft rotation axis R axis to provide the same lift of the cam follower, comprises at least part of an opening ramp of the EGR cam lobes 116c, 118c, 120c. In other words, according to a possible embodiment of the invention, at least a portion of the opening ramp 126 of at least one cam lobe 116c, 118c, 120c is contacted (engaged) by the cam follower 44 during the shifting movement of the shifting unit along the camshaft.

According to a possible embodiment, as for example shown in FIG. 3, the shifting unit 10 can be provided with two or more cams 116, 118, 120 for each cam follower and a single groove 128 provided there between. However, other possible embodiments can be provided, for example by using a single shifting unit having two or more cams and a groove and a relative driving pin, intended to control the movement of the shifting unit, for a single cam follower of the internal combustion engine.

The present invention also relates to a method of controlling the cylinder valve actuation of an internal combustion engine 12 provided with a cam shifting system 110 according to the invention. What is disclosed above in connection to the internal combustion engine can be applied to the method and vice versa. The method comprises the steps of operating the internal combustion engine to rotate the camshaft 38 in order to actuate the at least one exhaust cylinder valve 36b. The method further comprises the step of actuating the driving pin 130 to engage the shifting portion 128a of the groove 128 to move the shifting unit 112 with respect to the camshaft 38 along the camshaft rotation axis R. As already mentioned above, during the movement of the shifting unit 112 along the camshaft rotation axis R, the cam follower 44, 44a engages a portion 126 of an EGR cam lobe 116c, 118c, 120c of a first cam 116, 118, 120 arranged at the same distance from the camshaft rotation axis R, of a portion 126 of an EGR cam lobe 116c, 118c, 120c, of a different cam 116, 118, 120 to provide the same lift of the cam follower 44, 44a.

It has to be noted that the shifting movement of the shifting unit 112 can be performed in order to obtain the desired actuation (lift) of the at least one cylinder valve. Therefore, the engagement/disengagement of the driving pin 130 with the shifting portion 128a of the groove 128 of the shifting unit 112 can be performed, according to the present method, in order to provide the engagement of the at least one cam follower 44, 44a with the desired cam 116, 118, 120 having the desired profile to provide desired cylinder valve lift. The shifting movement of the shifting unit can be performed by means of the ECU 80 of the internal combustion engine controlling the engagement/disengagement of the driving pin 130 with/from the shifting portion 128a.

According to an embodiment, the method comprise a step of monitoring at least one value of at least one operating parameter of the internal combustion engine 12 during its operation. The at least one operating parameter can comprise an engine load correlated parameter, measured and/or evaluated by means at least one sensor, not shown, eventually in combination with stored data. The method step of actuating the driving pin 130 to engage the shifting portion 128a of the groove 128, to move the shifting unit 112 with respect to the camshaft 38, is carried out as a function of the monitored value of the at least one operating parameter.

According to a possible embodiment, the contact of the cam follower with at least two cams of the shifting unit is carried out by contacting a portion of at least two cam lobes of two cams having the same distance from the camshaft rotation axis to provide the same lift of the cylinder valve. During the movement of the shifting unit 112 along the camshaft rotation axis R, the cam follower 44, 44a engages a portion 126 of a cam lobe 116b, 118b of a first cam 116, 118, 120 arranged at the same distance from the camshaft rotation axis R, of a portion 126 of a cam lobe of a different cam, to provide the same lift of the cam follower 44, 44a.

As discussed above in connection to the internal combustion engine, at least a part of an opening ramp 126 of a cam lobe can be engaged by the cam follower during the shifting movement of the shifting unit.

The system of the present disclosure provides a secondary valve opening event with variable phasing, lift and duration for internal EGR quantity control from the light to high load engine operation. In particular, the system provides high internal EGR capability at low loads and controllability of internal EGR at high loads without requiring ultra-low lifts. This results in warm-up of the after-treatment exhaust components faster for higher conversion efficiency resulting in reduced HC and NOx engine-out emissions and increased combustion stability.

Figure 8:
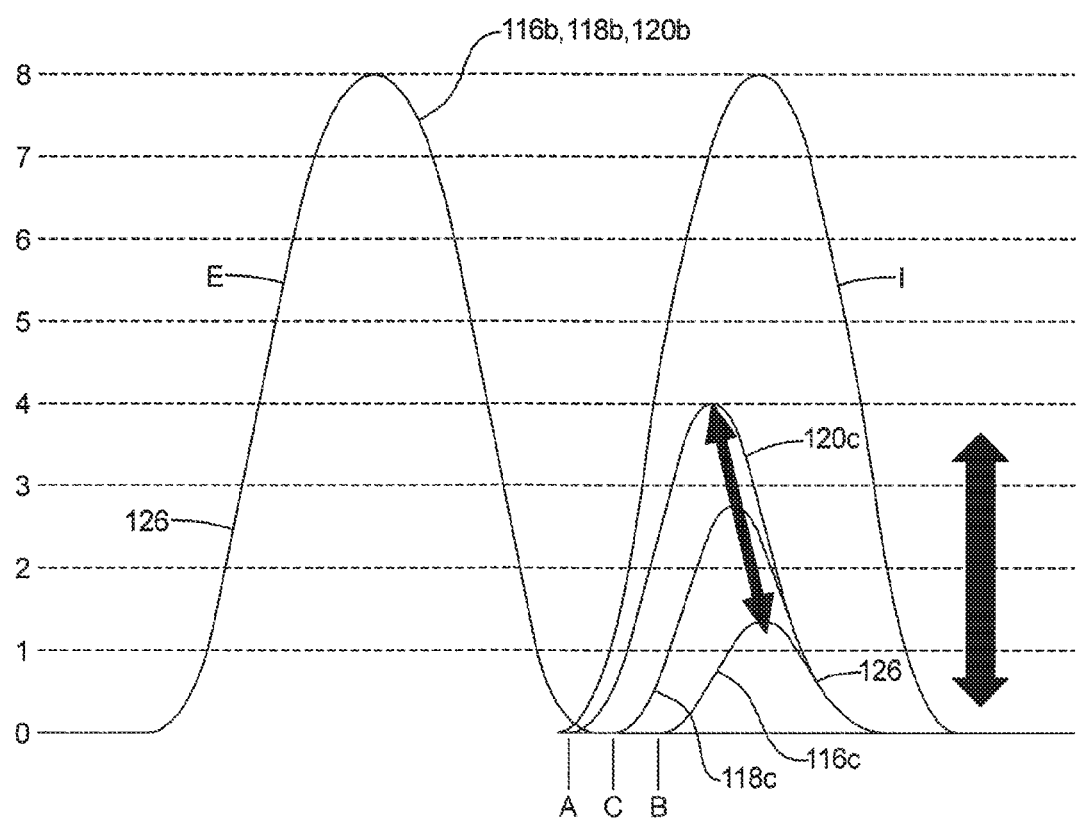
FIG. 8 is a graphic representation of the cam phasing of the internal EGR cam lobes according to the principles of the present disclosure.

In particular, with reference to FIG. 8, at engine light load, a higher lift and duration EGR cam lobe 120c can be selected with the cam lobe being phased toward the intake opening position "A", as illustrated in FIG. 8, while at high engine load a lower lift and duration EGR cam lobe 116c can be selected with the cam lobe being phased toward the intake closing at, for example position "B", as illustrated in FIG. 8. At medium load or during transition from high load to low load, it may be desirable to utilize a mid-range lift and duration EGR cam lobe 118c that is phased at a mid-range position C, as illustrated in FIG. 8. The relative phasing of the EGR cam lobes 120c, 118c, 116c can be implemented on the cam lobes based upon the optimal phase position for the engine operating conditions corresponding to each cam lobe. Alternatively, the ECU 80 can control the operation of the cam phaser 42 and shifting unit 112 according to a predetermined schedule depending upon the engine load so as to provide improved control from low engine load to high engine load internal EGR requirements. The internal EGR can provide faster control response of charge dilution during transient operation; efficient heating of the in-cylinder charge by recycling energy and species from previous cycle to intake charge; enhance the cold start warm-up of the engine partially replacing fuel-based warm-up strategies; and enable a higher after-treatment efficiency with lower emissions during the warm-up process of diesel engines.

Transitions from internal EGR to low-pressure EGR favor reductions of emissions spikes and increase the engine operating range applicability of low pressure EGR.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An internal combustion engine, comprising:
   an engine structure defining a combustion chamber and intake and exhaust ports in communication with the combustion chamber;
   an intake system in communication with the intake port;
   an exhaust system in communication with the exhaust port;
   a valve train assembly including an intake valve located in the intake port, an intake valve lift mechanism engaged with the intake valve, an intake cam engaged with the intake valve lift mechanism and defining an intake lift region adapted to open the intake valve during an engine intake stroke;
   an exhaust valve located in the exhaust port, an exhaust valve lift mechanism engaged with the exhaust valve and an exhaust cam having a plurality of cam lobes each including an exhaust lift region engaged with the exhaust valve lift mechanism and each of the plurality of cam lobes including an EGR lift region each being circumferentially spaced from the exhaust lift region and having different configurations and at least partially rotationally aligned with the intake lift region of the intake cam for providing internal exhaust gas recirculation; and
   a shifting system for shifting the exhaust cam to move axially with respect to the exhaust valve lift mechanism for selective engagement with the plurality of cam lobes; and
   a control unit for controlling the shifting system to alter the lift, duration and phase of the exhaust valve based upon engine operating conditions.

* * * * *